US007688564B2

(12) United States Patent
Byrne

(10) Patent No.: US 7,688,564 B2
(45) Date of Patent: Mar. 30, 2010

(54) PLUGGABLE SURGE PROTECTOR

(76) Inventor: Norman R. Byrne, 2736 Honey Creek NE., Ada, MI (US) 49301

( * ) Notice: Subject to any disclaimer, the term of this patent is extended or adjusted under 35 U.S.C. 154(b) by 0 days.

(21) Appl. No.: 11/570,265

(22) PCT Filed: Jun. 10, 2005

(86) PCT No.: PCT/US2005/020621

§ 371 (c)(1),
(2), (4) Date: Dec. 8, 2006

(87) PCT Pub. No.: WO2006/033687

PCT Pub. Date: Mar. 30, 2006

(65) Prior Publication Data

US 2007/0259548 A1 Nov. 8, 2007

(51) Int. Cl.
*H02H 3/22* (2006.01)
*H02H 1/04* (2006.01)

(52) U.S. Cl. .......................... 361/111; 361/117; 361/56

(58) Field of Classification Search ................. 361/127, 361/56, 111
See application file for complete search history.

(56) References Cited

U.S. PATENT DOCUMENTS 4,584,622 A * 4/1986 Crosby et al. ................. 361/56
4,587,588 A * 5/1986 Goldstein .................... 361/54
4,659,161 A * 4/1987 Holcomb .................... 439/490
4,703,386 A * 10/1987 Speet et al. ................... 361/56
4,912,590 A * 3/1990 Misencik et al. .............. 361/56
5,032,946 A * 7/1991 Misencik et al. .............. 361/56
5,096,434 A * 3/1992 Byrne ........................ 439/215
5,412,529 A * 5/1995 Eaton et al. ................... 361/90
5,844,736 A * 12/1998 Fukuda et al. ................. 360/8
6,071,126 A * 6/2000 Daoud ......................... 439/49
6,369,999 B1 * 4/2002 Wohlgemuth et al. ....... 361/111
6,380,862 B1 * 4/2002 Karim et al. ................ 340/635
6,614,636 B1 * 9/2003 Marsh ....................... 361/91.1

* cited by examiner

*Primary Examiner*—Stephen W Jackson
*Assistant Examiner*—Zeev Kitov
(74) *Attorney, Agent, or Firm*—Varnum, Riddering, Schmidt & Howlett LLP

(57) ABSTRACT

A power distribution system (300) is disclosed having a power source (302) with at least one circuit associated with a power line (310). The power line (310) is connected to an incoming power cable (312), which is further connected to a cable or conduit assembly (316) having at least one junction block. A surge protector (324) is pluggable into the junction block of the cable or conduit assembly (316). The surge protector (324) includes at least one male connector set (326) and an LED indicator (338).

13 Claims, 8 Drawing Sheets

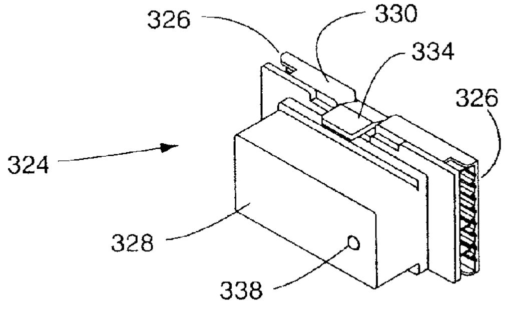
Fig. 10
Fig. 14
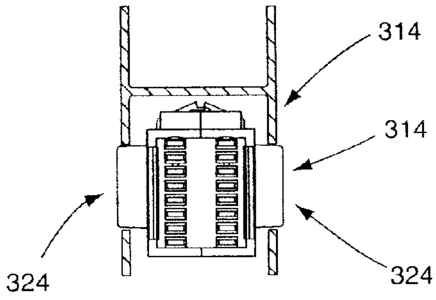
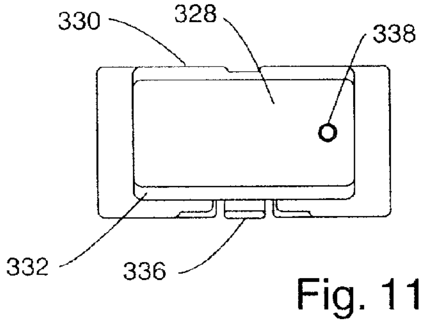
Fig. 11
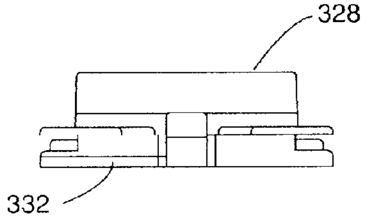
Fig. 12
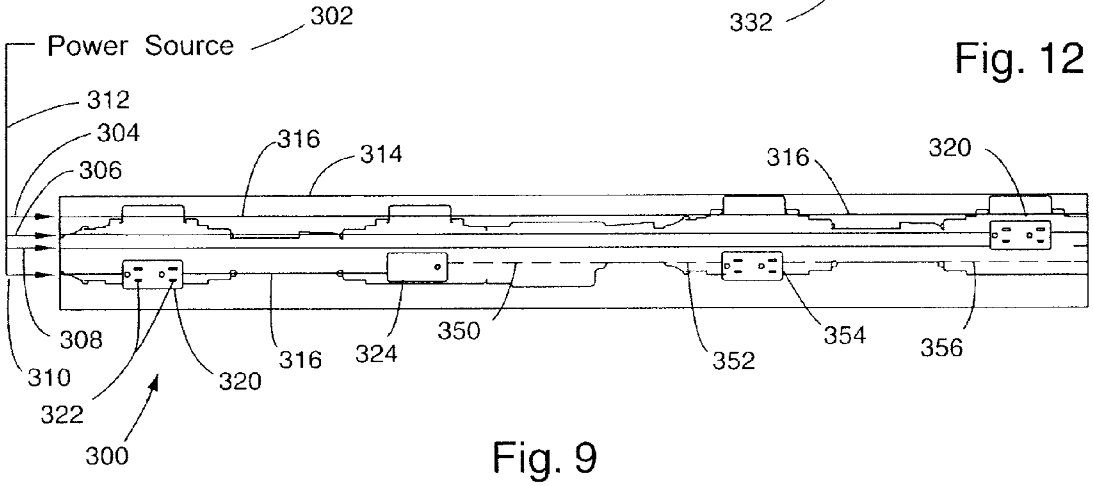
Fig. 9

PLUGGABLE SURGE PROTECTOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFISHE APPENDIX

Not applicable.

BACKGROUND OF THE INVENTION

1. Field of the Invention

The invention relates to electrical power distribution systems and, more particularly, to surge protection devices for use in such distribution systems, so as to provide for protected circuits, particular circuits of raceways or wall panels or the like.

2. Background Art

Known interior wall systems typically employ pre-fabricated modular units. These units are often joined together in various configurations, so as to divide a workplace into smaller offices or work areas. Generally, such modular wall panels may be equipped with means for receiving general building power and, possibly, general communications. Such building power may, for example, be conventional AC power received either under floor or from relatively permanent walls or the like. In various types of environments comprising electrical equipment, or wherein electrical apparatus are otherwise employed, interconnections of electrical components to incoming utility power are typically provided by means of cables or wires. For example, in office systems compromising modular furniture components, it is often necessary to provide electrical interconnections between incoming power supplies and various types of electrical devices typically used in an office environment, such as electric typewriters, lamps, etc. Computer-related devices, such as video display terminals and similar peripherals, are also now commonly employed in various office and industrial environments.

One advantage inherent in modular office systems is the capability to rearrange furniture components as necessitated by changes in space requirements, resulting from changes in the number of personnel and other business-related considerations. However, these modular systems must not only allow for change in furniture configurations, but also must provide for convenient interconnection of electrical devices to utility power, regardless of the spacial configuration of the modular systems and resultant variable distances between electrical devices.

In providing the interconnection of electrical apparatus and power inputs, it is necessary to include an arrangement for feeding the incoming utility power to the power outlets. In stationary structures, such as conventional industrial buildings and the like, a substantial amount of room would normally exist behind stationary walls and other areas in which to provide the requisite cabling for interconnecting incoming utility power to electrical receptacles mounted in the walls. Such systems, however, can be designed so as to remain stationary throughout their lifetime, without requiring general changes in the office or industrial environment areas.

In addition to receiving electrical power from the general incoming building power supply, modular office systems typically require communications connections for office equipment such as telephones, internet communications and the like. The problems associated with providing distribution of communications essentially correspond to the same problems existing with respect to distribution of conventional electrical power.

In this regard, it is known to provide modular wall panels with areas characterized as raceways. Often, these raceways are located along bottom edges of modular panels. The raceways are adapted to house electrical cabling and electrical junction blocks. The cabling and junction blocks are utilized to provide electrical outlets and electrical power connections to adjacent panels. However, it is also apparent that to the extent reference is made herein to providing electrical outlets and electrical power connections for adjacent panels, the same issues exist with respect to providing communications among panels.

Still further, it is known that the raceway of one modular wall unit may be provided with a male connector at one end, and a female connector at another end. Pairs of junction blocks, each provided with electrical outlets, made to be disposed at spaced-apart positions along the raceway. Conduits may be extended between the junction blocks and between the connectors in the junction blocks. In this manner, electrical interconnection is provided between the units.

The modular panels of a space-divider may be configured, such that adjacent panels are in a straight line, or at various angular positions relative to each other. It is common to configure intersecting walls in such a fashion that three or four modular wall panels may intersect at right angles. Each of the panels typically requires electrical outlets, and may require outlets on both sides of the panels. In any event, electrical power has to be provided to all of the panels, and often only one of the panels at the multiple panel junction is connected to a power supply source.

One example of a prior art system is illustrated in Propst's, et al., U.S. Pat. No. 4,382,648 issued May 10, 1983. In the Propst, et al. system, mating connectors of opposing panels are engaged when the panels are aligned in a straight line. When the panels are positioned in an intersecting relationship, specially manufactured couplers are utilized. One type of special coupler is used when the panels are positioned at right angles. Another type is used with adjoining panels arranged at angles other than right angles. Consequently, costly inventory of couplers must be maintained. The Propst, et al. system uses a double set of connectors comprising a male and female connector for each conductor to be interconnected. When a single one of these prior art panels intersects two adjacent panels, one of the specially manufactured couplers connects the female terminals to one of the adjacent panels, and another of the couplers connects the male terminals to the adjacent panel.

A further system is disclosed in Driscoll, U.S. Pat. No. 4,135,775, issued Jan. 23, 1979. In the Driscoll system, each panel is provided with an electrical outlet box in its raceway. Panels of different widths are provided with a pair of female connectors. Outlet boxes of adjacent panels are interconnected by means of flexible cables having male connectors at both ends. When three or four panels are adjoined in an intersecting arrangement, two cables may be connected the pair of female connectors at one end of an outlet box. In this manner, connection of two adjacent panels is facilitated.

Other systems also exist with respect to electrical connectors, junction boxes, and the like. For example, Rodrigues, U.S. Pat. No. 1,187,010 issued Jun. 13, 1916, discloses a detachable and interchangeable electrical switch plug adapted for use in connection with various electrically heated appliances. A clamping device is positioned in a fixed, but detachable relationship to one end of the plug. Means are provided to enclose and prevent sharp flexure of the cord comprising a flexible enclosing tube gripped under tension by the other end of the clamping device. The plug and the clamping device may be simultaneously removed from the socket.

Finizie, U.S. Pat. No. 2,540,575, issued Feb. 6, 1951, discloses a cord guide member for utensil plugs. The concept is to reduce wear on the cord and the connector plug, and to provide a connection which will withstand heavy pulling strains without injury. Strain relief is also provided. A sectional body is equipped anteriorally adjacent one end of the body with terminals. The other end of the body contains an anterior chamber or socket. A pivotable cord-guiding member having a pivot member is movably mounted in the socket. A wedge-shaped strain relief insert is received within a wedge-shaped recess in the pivot member. A cord extends into the pivot member and includes wires passing from the cord toward the terminals. The incoming portions of the wires are moved around the insert and firmly wedged within the recess.

Byrne, U.S. Pat. No. 4,551,577, issued Nov. 5, 1985, describes a retractable power center. The power center provides for conveniently located electrical power source receptacles adapted to be mounted on a work surface. In one embodiment, the power center includes a rectangular housing received within a slot in a work surface. A clamping arrangement is utilized to secure the housing to the work surface. A lower extrusion is connected to the lower portion of the housing. A movable power carriage mounts the receptacles and a catch assembly releasably maintains a carriage in a closed and retracted position. In response to manual activation, the catch assembly is released and springs tensioned between the carriage and the extrusion exert forces so as to extend the carriage upward into an extended, open position. In the open position, the user can energize the desired electrical devices from the receptacles, and then lower the carriage into the retracted position.

Byrne, U.S. Pat. No. 4,959,021, issued Sep. 25, 1990, discloses a pivotable power feed connector having a pivotal connector adapted to be connected to a flexible conduit or cable. The cable has a series of conductors extending there through. The connector is pivotably connected to a block assembly through which the conductors extend. The block assembly, in turn, is connectable to a contact block, with the conductors conductively connected to a set of prong terminals extending outwardly from the block. A cover is secured over the block so as to prevent the prong terminals from being exposed during assembly and disassembly.

The cover automatically exposes the prong terminals as the power feed connector is moved into engagement with a receptacle in a modular office panel. The connector allows the conduit or cable to be swiveled to an arc of approximately 180 degrees to any desired position. The connector is also manually removable from interconnection with the block assembly. Such removal allows the conduit or cable to be pulled back from the conductors and cut to a desired length. The connector includes a power feed cover which can be utilized in part to maintain the connector in either of two spatial configurations relative to the block assembly.

Nienhuis, et al., U.S. Pat. No. 5,013,252, issued May 7, 1991, discloses an electrified wall panel system having a power distribution server located within a wall panel unit. The server includes four receptacle module ports oriented in an h-shaped configuration. A first receptacle port is located on the first side of the wall panel unit and opens toward a first end of the unit. A second receptacle unit is also located on the first side of the wall panel unit, and opens toward a second end of the wall panel unit. A third receptacle port and a second sided wall panel unit opens toward the first end of the wall panel unit, while correspondingly, a fourth receptacle port on the second side of the wall panel unit opens toward the second end of the wall panel unit. First and second harnesses are each electrically connected at first ends thereof to the power distribution server. They extend to opposite ends of the wall paneled unit and include connector ports on the second ends thereof for providing electrical interconnection of adjacent wall panel units. The Nienhuis, et al patent also discloses a system with a wall panel connector interchangeably usable with the interconnection of two, three or four units. The connector includes a hook member for connecting together adjacent vertical members of frames of adjacent wall panel units at a lower portion thereof. A draw naught for connecting together adjacent vertical members of frames of adjacent wall panel units and an odd proportion thereof is provided by vertical displacement thereof.

Lincoln, et al., U.S. Pat. No. 5,073,120, issued Dec. 17, 1991, discloses a power distribution assembly having a bussing distribution connector. The connector includes a series of bus terminals positioned within an electrically insulative housing. A series of electrical terminals are positioned in the housing for distributing more than one electrical circuit. At least one ground terminal, one neutral terminal, and three hot terminals are provided. A grounding shell partially surrounds the bus connector and includes a grounding tab grounding the one ground terminal to the metallic grounding shell. In another embodiment, two bus connectors are interconnected together, so as to provide for an increased number of output ports.

Byrne, U.S. Pat. No. 5,096,431, issued Mar. 17, 1992, discloses an outlet receptacle with rearrangeable terminals. The receptacle is provided with input terminals to selected positions, for engagement with terminals of an electrical junction block. The block includes a series of terminals representing a plurality of different electrical circuits. The receptacle block has neutral, ground and positive flexible positive conductor bars electrically connected to neutral, ground and positive electrical terminals. Input terminals of the block are formed integral with the flexible conductor bars and levers are provided for moving the terminal ends of the conductor bars to physically different positions. In one configuration, the receptacle block housing is provided with openings at opposing ends, and the flexible conductor bars have terminal ends controlled by levers at both ends of the outlet receptacle block. In another configuration, the block has output terminals in a front wall, and the input terminals of the receptacle block are formed as ends of the flexible bars and extend at an approximately 90 degree angle to the bars. They further send through openings in the back wall of the outlet receptacle for engagement with terminals of a junction block. Levers are provided in the back wall of the receptacle block for positioning the terminal ends in alignment with different terminals of the junction block, and windowed openings in the front wall expose indices on the levers identifying selected circuits.

Byrne, U.S. Pat. No. 5,096,434, issued Mar. 17, 1992, discloses an electrical interconnection assembly for use in wall panels of a space divider wall system. The system includes junction blocks having several receptacle connectors, so as to provide a plurality of electrical outlets on both sides of a wall panel. The junction block is connected by means of conduits extending from both ends of the junction block to oppositely directed connector blocks for connection to adjoining panels. The assembly of the junction block and connector blocks allows electrical power to be supplied to one end of the panel and conducted to and through the junction block to other panels. The receptacle connectors on the junction block each have one type of terminal configuration, e.g., a female electrical terminal configuration. One of the connector blocks is provided with the identical terminal configuration. The other connector block is provided with a matching terminal configuration, e.g., a male electrical terminal configuration. When two wall panels are joined at their respective edges, the male connector block may be readily connected to the female connector block in the adjacent panel. When two panels are joined to a third panel, all at one point, the arrangement of this invention allows the male connector block to be connected to the female connector block of one of the other two panels, and the male connector of the other of the two panels may be connected to one of the receptacle connectors of the junction block on either of the other two panels, in this manner establishing a three way interconnection arrangement. In a similar fashion, a fourth, or other additional panels may be added to the junction and plug into receptacle outlets of other panels in order to provide an arrangement of panels that is totally interconnected, electrically.

Snodgrass, et al., U.S. Pat. No. 5,164,544, issued Nov. 17, 1992, describes an electrified space dividing panel having a panel member, raceway, modular, or electric system disposed in a raceway and raceway covers for gaining access to the system. The system includes a single terminal block having end and side sockets, with first and second electrical receptacles being respectively removeably engaged with the end socket and the side sockets, such that the first and second electrical receptacles are disposed in horizontally spaced, side-by-side relation and project outwardly for predetermined light dimensions through receptacle openings in one of the raceway covers. The raceway can include a web having an opening which cooperates with a support ear on the first receptacle during engagement of the first receptacle with an end socket, so as to provide additional lateral support for the electrical receptacle when a plug is removed there from.

Kilpatrick, et al., U.S. Pat. No. 5,178,555, discloses a kit which includes a junction box for installation along a raceway. The kit includes a mounting bracket having a first adjustable mounting mechanism for locating the bracket along the raceway. This provides an initial adjustment, and a second adjustable mounting mechanism is provided for securing the junction box to the mounting bracket. This adjustably locates the junction box along the mounting bracket, and provides a second or final adjustment to accurately locate the junction box between two pre-measured lengths of cable.

Byrne, U.S. Pat. No. 5,259,787, issued Nov. 9, 1993, discloses an electrical junction block mounting assembly, which may be utilized for mounting the junction block within a raceway. The assembly includes a cantilever beam formed on an outer wall of the junction block. This beam is provided with a transversely extending channel for engagement with a support structure. The beam is attached to the junction block by means of a resilient hinge section, and is provided with a first arm section extending between the hinge section and the channel, and a second arm section extending beyond the channel. The first arm section has a sloping surface sloping away from the outer channel between the hinge section of the panel. The second armed section has a sloping surface sloping toward the wall beyond the channel. The surfaces will contact a mounting rail or similar structure during installation of the junction block. In this manner, the hinged cantilever beam is deflected until the rail is in alignment with the channel for engagement with the structural support member.

Also advantageous for power distribution systems utilized with raceways and the like is the concept of potentially providing for surge protection. Principles of surge protection circuits are relatively well known in the art. However, the concept of providing for surge protection can sometimes lead to difficulties associated with providing for such protection within relatively confined spaces, such as may exist with raceways within wall panels or the like. Also, it is advantageous if surge protection devices allow the user to select whether a circuit is to be protected by such a surge protection device or, alternatively, left unprotected. In certain instances, where a series of circuits may exist within a single raceway, it would be advantageous if a surge protector could be utilized which would have the capability of selecting which of these circuits are to be protected.

An example of a power surge protector utilized in a system comprising modular wall panels is disclosed in Eaton, et al., U.S. Pat. No. 5,412,529 issued May 2, 1995. Eaton discloses a modular wall panel assembly having a concealed and prewired electrical system associated therewith. The system comprises a multi-wire powerway defining at least one power circuit, with the powerway preferably defining multiple power circuits. The powerway is coupled to at least one surge protector disposed interiorly in the wall panel member, and providing power protection to a power circuit thereof. The surge protector comprises either a power surge protector or an uninterruptible power supply. A powerway is disclosed which has at least two power circuits having power circuit receptacle terminals constructed so as to allow a compatible receptacle element to be selectively positioned on the powerway, in a power delivery relationship with any of selected ones of the multiple power circuits.

Ahuga, U.S. Pat. No. 6,157,529 issued Dec. 5, 2000 discloses a basic surge protector for protecting electrical equipment connected on its load side from excessive transient voltages or surges above a predetermined value, on its line side or its hot side. A fuse is used to monitor a fault current flowing into a surge voltage suppression device, due to excessive voltage across the device. The fuse blows resulting from an over current condition, and disables and opens a solid state switch or an electromechanical switch mounted in series in the line. In this manner, the secondary or load side is protected from over voltages and surges. Ahuga also discloses circuits providing for automatic setting and resetting after an over voltage fault condition on the line has been protected. The protection device can be rendered into a single chip, solid state device.

Waas, U.S. Pat. No. 6,188,560 issued Feb. 13, 2001 describes a multi-wire terminal block employing a removable surge protector. The block has a housing with a series of test ports and electrical contact elements. Each includes a test lead accessible through one of the tests ports. The contact elements are configured in the housing and connected to an exchange wire which is secured to a stub cable. A protection module is secured to a side of the housing adjacent the test ports so as to form a series of retaining cups adapted to receive a protection module. A grounding strip is secured to ground and retained between the protection module retainer and the housing adjacent the test ports. The grounding strip includes a series of integral ground connectors. The protection module includes a protector connected to a pair of terminal block contact elements and a ground connector. When inserted into the retaining cup, the contact elements engage a pair of corresponding test lead and test ports. The ground connector engages a grounding strip so as to provide surge protection to a pair of conductive paths through the connection of the leads in the ports. The protection module may be removed or replaced as needed.

LaHoud, U.S. Pat. No. 6,266,220 issued Jul. 24, 2001 discloses an internal surge protection device for an electronic component. The device is primarily directed to electronic elements which may be associated with circuit boards.

Wohlgemuth, et al., U.S. Pat. No. 6,369,999 issued Apr. 9, 2002 discloses a portable surge protector having a housing with a central opening and an internal cavity surrounding the opening. By rotation of a mounting reel, a cord moves between a closed position within the housing to an extended position outside of the housing. An electrical connector is pivotably supported in the central opening housing and has at least one socket and a set of prongs that extend outwardly from the socket. The connector can be rotated to a first position normal to the housing, in which the prongs and the socket are exposed for use, or to a second position parallel to the housing, in which the socket and prongs are recessed.

Karim, et al., U.S. Pat. No. 6,380,862 issued Apr. 30, 2002 discloses an electrical distribution panel having a surge protector. The distribution panel is associated with a load center and includes an enclosure having a window and a series of openings. Inputs are adapted for connection to power lines. A circuit breaker mounting mechanism houses a series of circuit breakers in association with corresponding ones of the enclosure. A surge protector device is mounted within the enclosure apart from the mounting mechanism. The device is electrically connected with the inputs for protecting the loads from surges or transients on the power lines. The surge protector device includes at least one indicator, visible through the window of the enclosure.

SUMMARY OF THE INVENTION

In accordance with the invention, surge protection means are provided within a power distribution system for use in distributing electrical power. The distribution system includes a source of incoming electrical power, comprising at least a first electrical circuit. A cable or conduit assembly includes at least a first junction block coupled to interconnecting cables, with at least one of the interconnecting cables electrically coupled to the incoming power circuit. Electrical receptacle means are releasably connectable to the first junction block.

A second junction block is electrically connected to the first junction block. The surge protection means are releasably connectable to the second junction block, and are pluggable to said second junction block. The surge protection means includes means for protecting the first junction block and the electrical receptacle means from excessive voltages which may be applied to the first electrical circuit.

The surge protection means can include a first connector set adapted to releasably plug into a second connector set associated with the second junction block. Still further, the surge protection means can include visual indicator means viewable by a user, and responsive to the state of circuitry within the surge protection means, so as to indicate whether the surge protection means have been tripped. Still further, the surge protection means can include a second connector set extending outwardly from an end of the surge protection means which opposes an end of the surge protection means comprising the first connector set.

The second junction block can be electrically positioned between the source of incoming electrical power and the first junction block. The first junction block can be positioned along the cable or conduit assembly so that the first junction block is within thirty five feet of the second junction block. The first junction block can also be positioned between fifteen and thirty feet of the second junction block.

The electrical receptacle means can be capable of being releasably connected to the second junction block in the absence of the surge protection means being connected to the second junction block. Correspondingly, the surge protection means is capable of being releasably connected to the first junction block, in the absence of the electrical receptacle means being connected to the first junction block.

The surge protection means can include a first set of connectors adapted to releasably plug into a connector set associated with the second junction block. A second set of connectors can oppose the first set of connectors, and can be adapted to releasably plug into a connector set of either the first junction block or a further junction block. The first connector set can extend outwardly from one end of the surge protection means, and the second connector set can extend outwardly from an opposing end of the surge protection means. The source of incoming power can include a plurality of electrical circuits. The source protection means can include means for electrically connecting into the plurality of electrical circuits, and can also include means for protecting junction blocks and electrical receptacle means from excessive voltages which may be applied to two or more of the plurality of electrical circuits.

The surge protection means can include at least one surge protector. The surge protector can include connector terminals having at least one hot terminal, one ground terminal and one neutral terminal. The hot terminal can be connected in series to a fuse. A first varistor can be connected between the ground terminal and one end of the fuse. A second varistor can be connected between the ground terminal and the neutral terminal. Also, a third varistor can be connected directly between the hot terminal on an opposing side of the fuse, and the neutral terminal. A diode can also be included. Still further, the surge protector can include a series connection of a resistor and an LED indicator extending in parallel configuration to the third varistor.

The surge protector can further include means for electrically connecting the protector to one of the junction blocks. Means can also be included for protecting the junction blocks and the electrical receptacles from excessive voltages which may be applied to circuitry electrically connected to the junction blocks. Connector means can be releasably and electrically connected to a junction block device, with the junction block device having junction block connector means for connecting the surge protector electrically to the junction block. Means can also be included for protecting the junction block from excessive voltages applied to circuitry extending through the junction block. The junction block connector means can also be capable of electrically connecting the electrical receptacle to the junction block.

BRIEF DESCRIPTION OF THE DRAWINGS

The invention will now be described with reference to the drawings, in which:

FIG. 9 is a diagrammatic view of a power distribution system having an incoming power source, with the distribution system adapted for use within a raceway, and showing the use of a surge protector in accordance with the invention;

FIG. 10 is a perspective view of a surge protector which may be utilized in accordance with the invention;

FIG. 11 is a side elevation view of the surge protector shown in FIG. 10;

FIG. 12 is an underside view of the surge protector shown in FIG. 10;

FIG. 14 illustrates a junction block which may be utilized with a surge protector as shown in FIG. 10;

DESCRIPTION OF THE PREFERRED EMBODIMENT

The principles of the invention are disclosed, by way of example, in a power distribution system 300 as illustrated in FIGS. 9-16. The power distribution system 300 advantageously includes at least one pluggable surge protector in accordance with the invention, which may be "plugged" into known circuit assemblies so as to provide for at least one protected circuit. The pluggable surge protector provides a significant advantage over the prior art, in that it can be utilized at various locations within the distribution system 300 to provide for protection of receptacle blocks and electrical receptacles "downstream" of the surge protector. For purposes of describing a configuration where the surge protector in accordance with the invention may be utilized, the following paragraphs describe a prior art electrical interconnection assembly which was adapted for use within wall panels of a space divider wall system. The assembly shown in these prior art drawings of FIGS. 1-8 depict a junction block with several receptacle block connectors, so as to provide a series of electrical outlets on both sides of the wall panel. The junction block is connected by means of conduits or cables extending from both ends of the junction block to oppositely directed connector blocks for connection to adjoining blocks or panels. This assembly of a junction block and connector blocks allows electrical power to be supplied to one end of the panel and conducted to and through the junction block to other junction blocks in the same or other panels. Again, the interconnection and junction block assembly shown in FIGS. 1-8 represent a prior art assembly.

Figure 1:
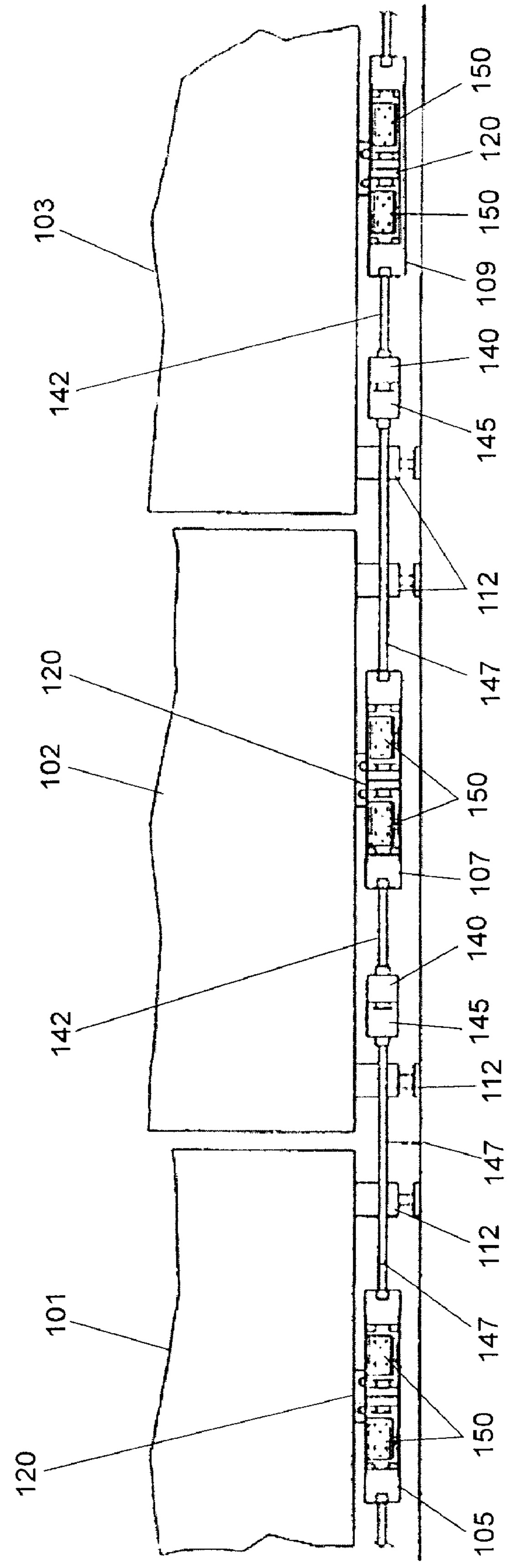
FIG. 1 is a prior art, fragmentary elevation view of a plurality of adjacent wall panels and electrical connection assemblies arranged in the panels.

FIG. 1 is a fragmentary elevational view of adjacent modular wall panels 101, 102, 103 of a rearrangeable wall system. The wall panels are provided with electrical interconnection assemblies 105, 107 and 109 in a raceway area formed along the lower edge of panels 101, 102 and 103. Each of the panels is provided with substantially flat support legs 112 which allow for passage of electrical conduits in the raceway. Raceway covers, customarily used, have been omitted from the drawing in FIG. 1 to better show the electrical junction assemblies. Each of the electrical interconnection assemblies 105, 107, and 109 is provided with a junction block 120, a female electrical connector block 140 and a matching male connector block 145. The connector blocks 140, 145 are connected to associated junction blocks 120 by means of conduit sections 142 and 147, respectively. Each of the junction blocks 120 is shown in FIG. 1 to be provided with a pair of electrical outlet receptacles 150. Junction blocks 120 are double sided and corresponding pairs or outlet receptacles are provided on the opposite side of each of the wall panels 101, 102 and 103 (not shown in the drawing) to allow various electrical equipments to be plugged into the outlets from either side of the panel.

Figure 2:
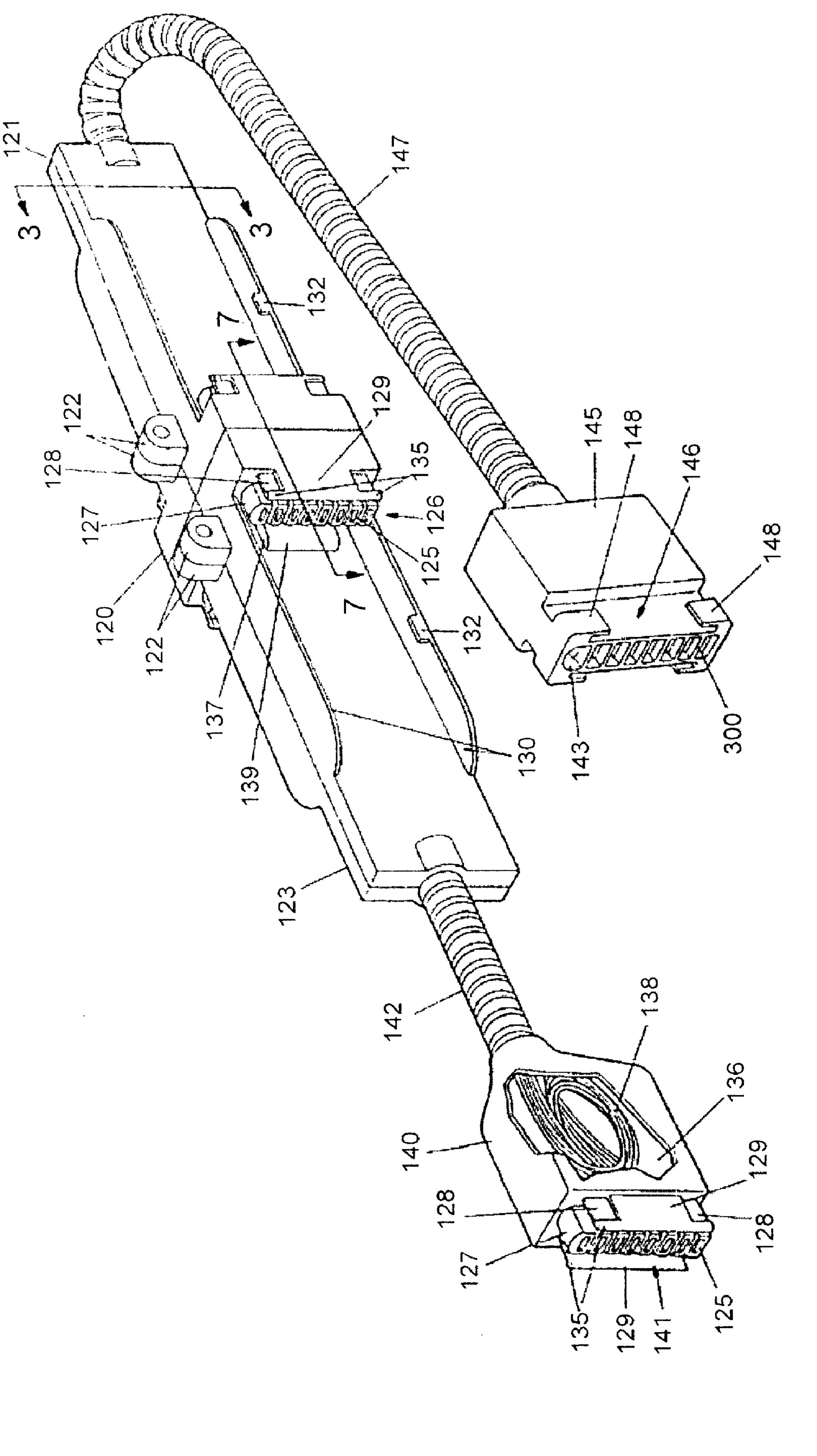
FIG. 2 is a prior art, enlarged prospective view of one of the electrical interconnection assemblies of FIG. 1.

FIG. 2 is an enlarged perspective view of one of the electrical interconnection assemblies, for example assembly 107. The junction block 120 is provided with support lugs 122 by which the junction block is supported by standard fasteners extended through support tables extending from the bottom edge of the wall panel, e.g., wall panel 102. Junction block 120 comprises an elongated housing having opposing ends 121 and 123 and a symmetrical center section comprising four female receptacle connectors 126. Only one of the receptacle connectors 126 is fully exposed in FIG. 2. There is a pair of connectors 126 on each side of the housing and the connection on each side face in opposite directions. Support flanges 130 are provided adjacent each of the female connectors to provide support for electrical outlet receptacles engaged with the connectors 126. In this manner, junction block 120 is adapted to support four electrical outlet receptacles, two on each side of a wall panel to which junction block 120 is attached. The junction block assembly further comprises end connector block 140, provided with a female connector 141, and connected via a standard electrical conduit 142, which may be a flexible conduit, to end 123 of junction block 120. Similarly, connector block 145, provided with a male connector 146 is connected via flexible conduit 147 to end 121 of junction block 120. In a straight line connection arrangement, as depicted for example in FIG. 1, wherein a plurality of panels are positioned adjacent each other, electrical power is transmitted between panels by connection of male connector block 145 to female connector block 140 of the adjacent junction assembly.

Electrical power is transmitted through the junction assembly by means of electrical wires disposed in the conduits 142, 147, terminated on connectors 141 and 146, respectively, and connected to receptacle connectors 126 in junction block 120. Accordingly, electrical power is transmitted through interconnecting panels and is at the same time made available at electrical outlet receptacles in each panel. Conduit 147, provided with the male connector block 145, may be a fixed-length conduit and conduit 142 may be of a length such that female connector block 140 is positioned at substantially the same distance from the panel edge in each panel independent of the width of the panel. Thus, female connector block 140 will always be accessible to male connector block 145 independent of the width of the panels. To accommodate panels of different widths, conduit 142 may be an expandable flexible conduit, such as are well known in the art. In that case, connector block 140 may be provided with an inner spatial area 136, as shown in a partially broken-away view in FIG. 2. The inner spatial area 136 is provided for storage of excess length of electrical wiring 138 in a coiled or other configuration. The excess length of electrical wiring 138 may be withdrawn when conduit 142 is expanded to an extended length.

This arrangement is similar to that disclosed in Byrne, my earlier U.S. Pat. No. 4,579,403 issued Apr. 1, 1986.

Figure 4:
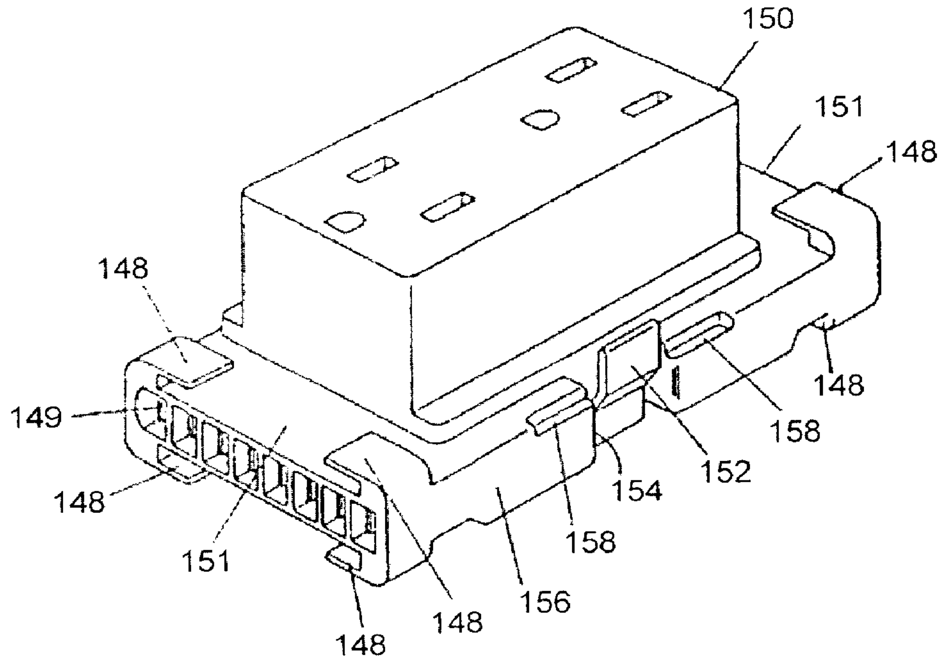
FIG. 4 is a prior art, enlarged prospective view of an outlet receptacle shown in FIG. 1.

The conduit 147 is preferably a flexible conduit which may be bent to accommodate a connection to adjacent panels which are disposed at angular positions with respect to each other, rather than in a straight line. The junction assemblies of this invention readily accommodate an arrangement in which three or more panels are disposed in an intersecting relationship, as will be discussed further herein with respect to FIG. 6. In such a configuration, the male connector block 145 of one of the panels may be connected to one of the female receptacle connectors 126 of a junction block assembly in an adjacent wall panel. For this purpose, the female connector 141 of connector block 140 and female receptacle connectors 126 on junction block 120 have been made identical. Similarly, the male connector 146 on connector block 145 has been made identical to the male connector of electrical outlet receptacle 150, shown in FIG. 1. Greater detail of the receptacle 150 is shown in FIG. 4 and is described below. As may be seen from FIG. 2, the female connectors 126 and 141 are each provided with a pair of side flanges 129 having upper and lower recessed areas 128, for engagement with flanges 148 of a male connector to provide a locking arrangement. FIG. 129, which are made of a resilient plastic material and formed integral to the housing to which they are connected, are provided with an outwardly extending inclined end surface 135. When surfaces 135 are engaged by flanges such as flanges 148 of connector 146 on connector block 145, the flanges 129 will be deflected inward, allowing flanges 148 of the male connector to engage recesses 128 to provide a locking engagement of the male and the female connectors. A protuberance 137 is provided with a generally rounded edge surface 139 and acts as an entry guide as a male connector is engaged in female connector 126. The female connectors 126, 141 are each provided with a plurality of female connector terminals 125 and a key lug 127. Male connector 146 is provided with a plurality of male connector terminals 149 and an opening 143 for receiving key lug 127.

Figure 5:
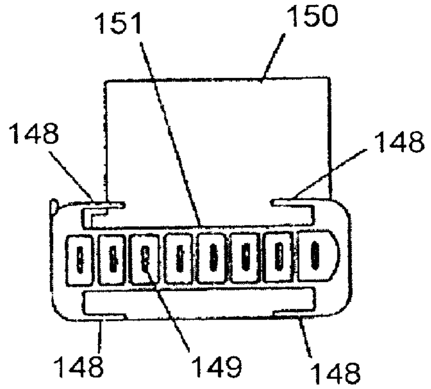
FIG. 5 is a prior art side elevation view of the outlet receptacle of FIG. 4.

The electrical outlet receptacle 150, shown in FIG. 4, is provided with male connectors 151 at both ends, allowing the receptacle to be plugged into any one of the four female receptacle connectors 126 of junction block 120. As shown in FIG. 2, junction block 120 is provided with upper and lower support flanges 130 to support receptacles 150 in each of the four female connectors 126. The lower support flanges 130 are provided with a locking flange 132. The receptacle 150 is provided with a spring latch 152 disposed in recess 154 in the surface 156 of receptacle 150. Surface 156 engages one of the lower support flanges 130 when the receptacle 150 is installed in the junction block 120. The locking flanges 132 will be aligned with the recess 154 when the receptacle 150 is inserted between flanges 130, causing the spring latch 152 to be depressed. The receptacle 150 may then be moved to either the left or to the right to engage one of the female connectors 126. Recesses 158 are provided in receptacle 150 to accommodate locking flange 132 and movement to either the left or to the right by a sufficient distance will cause the spring latch 152 to be moved past locking flange 132, causing the spring latch 152 to return to its extended position. Hence, receptacle 150 will be retained in a locked position. The receptacle may be removed by depressing spring latch 152 and sliding the receptacle 150 to either left or right to align the locking flange 132 with recess 154. FIG. 5 is a right-hand elevation of receptacle 150 showing a right-hand elevation or receptacle 150 showing right-hand male connector 151.

Figure 3:
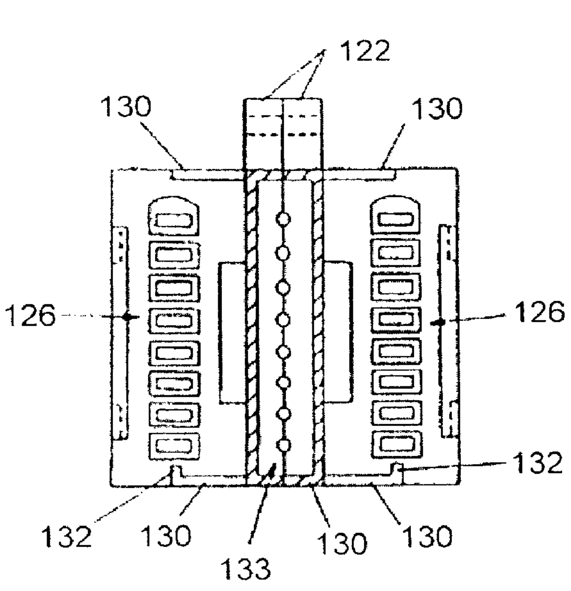
FIG. 3 is a prior art cross-sectional view taken along lines 3-3 of FIG. 2.

FIG. 3 is a cross-sectional view of junction block 120 taken along line 3-3 of FIG. 2. FIG. 3 shows two of the four receptacle connectors 126 of connector block 120. One of the two connectors 126 shown in FIG. 3 is disposed on each side of the central housing section 131, which contains a plurality of wires 133. An eight-wire system is shown in this illustrative embodiment. Each of the male and female connectors are provided with eight separate terminals, and eight separate electrical wires 133 extend through the connector blocks 140, 145, the conduits 142, 147 and the central section 131 of the junction block 120. By way of example, these may include two ground terminal wires, three neutral wires and three positive wires representing three separate circuits, with a shared ground for two of the circuits. Similarly, 10- or 12-wire systems may be readily accommodated, having corresponding number of terminals on each of the connectors and providing a greater number of separate circuits. The four female receptacle connectors 126 are each connected to the wires 133 by means of a plurality of contact blades, described later herein with respect to FIGS. 7 and 8. Each wire, together with the connector block terminals and receptacle connector terminals to which it is connected, is referred to herein as a circuit element. A particular circuit may be selected for use by one of the receptacles 150 by appropriate wiring connections internal to the receptacle. Since all of the circuits are connected to each one of the receptacle connectors 126 of junction block 120, a connector block 145 of an adjacent panel, equipped with a male connector, may be connected to any one of the receptacle connectors 126. In this manner, electrical power may be provided to receptacle connectors to junction block 120 and to associated connector blocks 140, 145 and hence to any adjacent panels to which these connectors may be connected. Similarly, a connector block 145 equipped with a male connector connected to one of the female connectors 126 may receive electrical power for distribution to a panel to which the connector block 145 belongs. Such interconnecting arrangements are described further herein with respect to FIG. 6.

Figure 7:
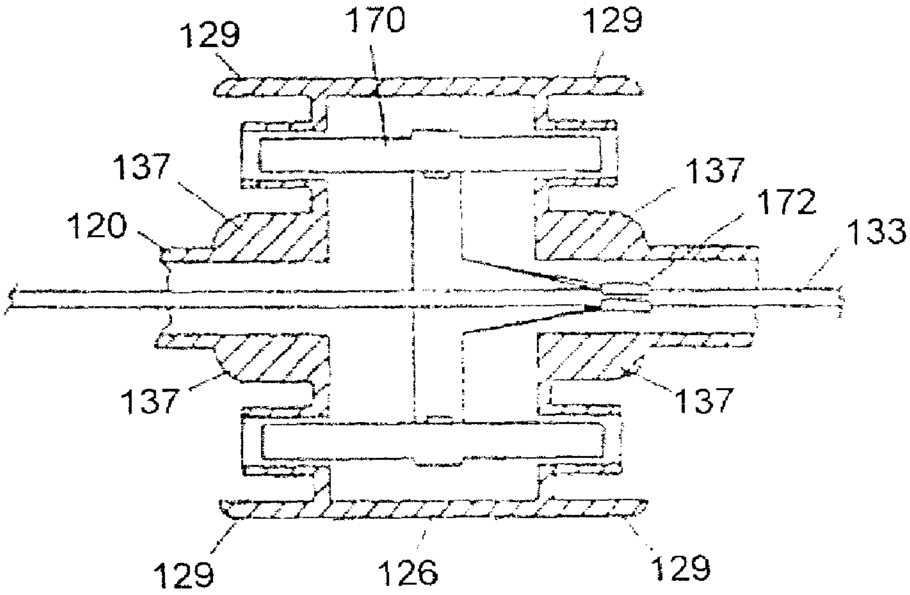
FIG. 7 is a prior art, fragmentary cross-sectional view taken along lines 7-7 of FIG. 2.
Figure 8:
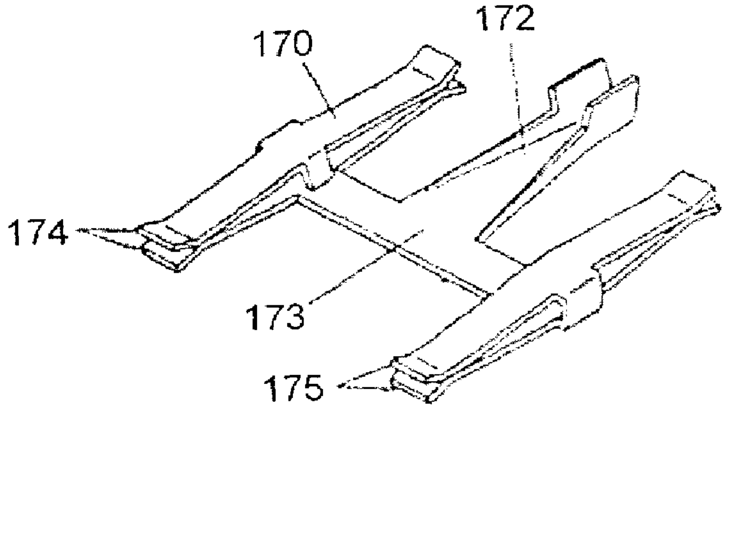
FIG. 8 is a prior art, prospective view of a receptacle contact blade shown in FIG. 7.

FIG. 7 is a fragmentary cross-sectional view along line 7-7 of FIG. 2. Shown in FIG. 7 is a contact blade structure 170 which is one of eight such blades disposed in central housing section 131. Each such blade is in electrical contact with one of the conductors 133. Connection to conductor 133 is made by means of a crimped connection of blade extension member 172 to conductor 133. As may be more readily seen from the perspective view of FIG. 8, the extension member 172 is part of a center section 173 which is connected to left-hand upper and lower contact blades 174 and right-hand upper and lower contact blades 175. The upper and lower contact blades on each side from the female opening part of the conductor 126 for engagement with blades of a male connector.

Figure 6:
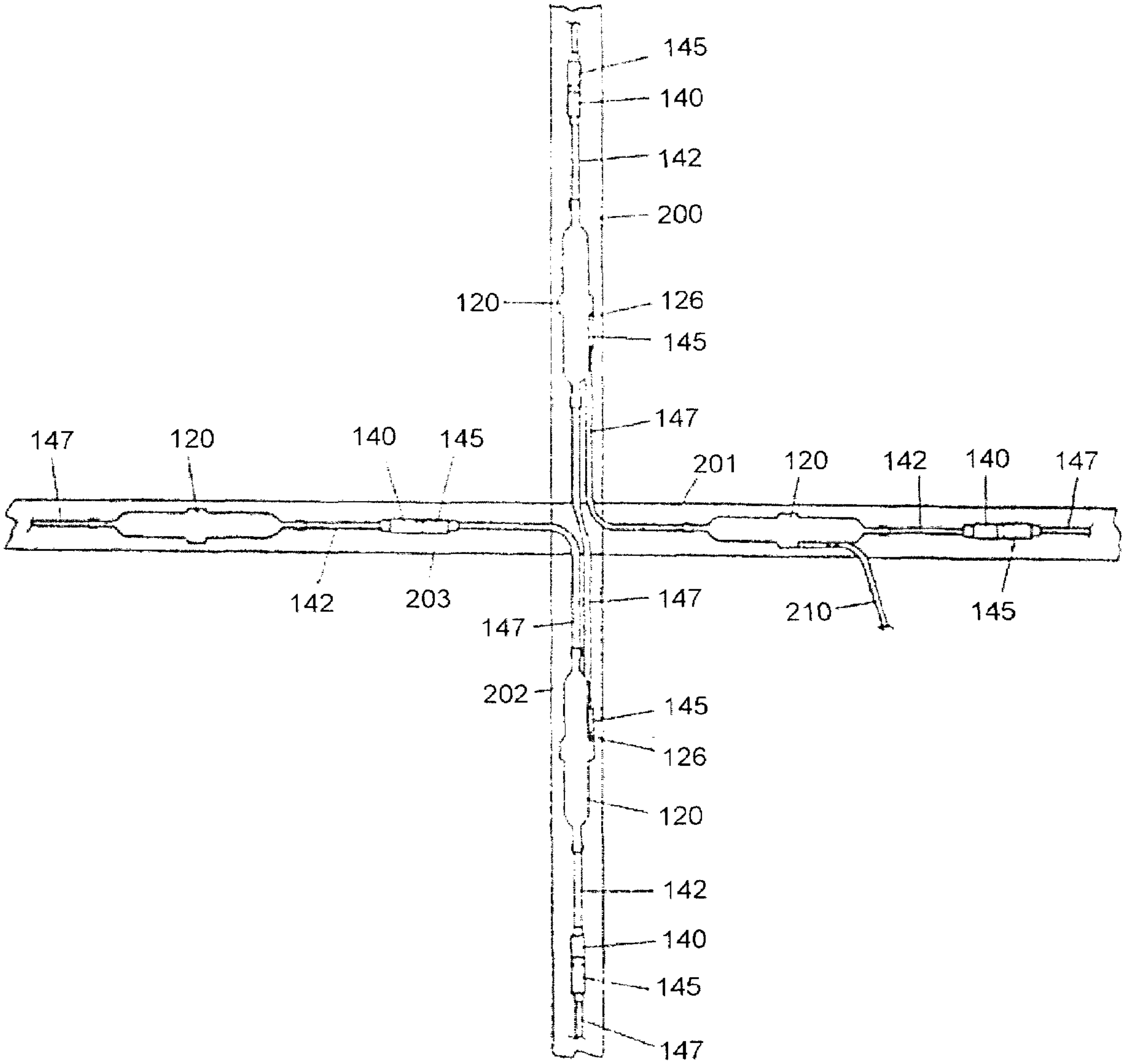
FIG. 6 is a prior art, fragmentary plan view of raceway areas of four wall panels, illustrating wall panel interconnections.

FIG. 6 is a fragmentary plan view of raceway areas of four wall panels illustrating the connections of interconnection assemblies of the invention in a configuration in which the four panels are disposed at right angles to each other. As will be apparent from the following description, the specific angle at which the panels are positioned is not particularly significant. Furthermore, the invention is equally applicable to a three-panel configuration or a five-panel configuration disposed at right angles to each other. Each of the four panels is provided with an interconnection assembly, as shown in FIG. 2, comprising a junction block 120, a male connector block 145, and a female connector block 140 attached to the junction block 120 by means, of flexible conduits 147 and 142, respectively. The junction block 120 is disposed within each panel raceway near one edge of the panel. Panels 200, 201, 202 are positioned such that the end at which these panels are joined to other panels is the end near which the junction block 120 is positioned. One of the panels, panel 203, is positioned with an opposite orientation in which the end near which the junction block 120 is located is positioned opposite the point of junction of the four panels. The flexible conduit 147, provided with the male connector block 145, extends beyond the end of the panel in which it is positioned, and the flexible conduit 142, provided with a female connector block 140, is terminated just short of the end of the panel. Thus, as is also shown in FIG. 1, a connection is made between panels by extending the flexible conduit 147 with male connector block 145 into the raceway area of the adjacent panel to engage the female connector block 140 at the end of flexible conduit 142. In the configuration of FIG. 6, the male connector block 145 of panel 202 and its associated flexible conduit 147 extend into the raceway area of panel 202 to engage female connector block 140 of panel 203. It will be apparent that the connection as shown between panel 202 and 203 may be made whenever these panels are adjacent and independent of the angle at which the panels are disposed with respect to each other. In the configuration of FIG. 6, the flexible conduit 147, with its male connector block 145, associated with the panel 200 are extended into the raceway area of panel 202 for engagement with one of the female receptacle connectors 126 of junction block 120 in panel 202. In this manner, an electrical connection is established among the junction blocks of the three panels 200, 202, and 203. Thus, electrical power provided from an external source to any one of these three may be distributed to the other two by means of the connection arrangement shown by way of example in FIG. 6. In the arrangement of FIG. 6, flexible conduit 147 and its male connector block 145 of panel 202 is connected to one of the female connectors 126 of junction block 120 of panel 200 thereby establishing an electrical connection between panels 200 and 201. This connection, in combination with the other connections shown in FIG. 6 and described in the previous sentences, completes an arrangement for establishing an electrical connection from any one of four panels to the entire four-panel configuration. Additional connections may be envisioned by connections of male connectors 145 from other panels into additional ones of the female receptacle connectors 126 of the junction blocks 120 of any of the panels 201 through 203, should one choose to provide an arrangement of more than four intersecting panels. Furthermore, additional conduits, such as conduit 210 shown in FIG. 6, may be connected by means of a male connector to any of the receptacle connectors 126 to provide electrical power to lamps or other fixtures. As can be seen, a great deal of flexibility has been achieved by the electrical junction assembly in accordance with this invention.

The foregoing description is a disclosure of an example prior art system, adapted for use in wall panels of a space divider system. Turning to the specific embodiments in accordance with the invention, the power distribution 300 is adapted to be utilized in facilities where elongated distribution is required. For example, the power distribution system 300 may be utilized within a raceway 314, illustrated in diagrammatic form in FIG. 9. The raceway 314 may exist within a wall panel or the like, such as those described with respect to the prior art system illustrated in FIGS. 1-8. Turning to the power distribution system 300 as illustrated in FIG. 9, the distribution system 300 is powered by an incoming power source 302, which may be in the form of conventional AC building power or the like. The power source 302 can be applied as incoming power through an incoming power cable 312. The incoming power cable 312 may carry a sufficient number of hot, neutral and ground wires, so as to form, for example, four separate circuits. In FIG. 9, the four separate circuits are illustrated by the power lines 304, 306, 308 and 310. It should be emphasized that each one of the power lines may actually consist of three wires, namely a hot, neutral and ground wire, with common grounds used for certain of the circuits. As the incoming power is supplied on the power lines 304, 306, 308 and 310 to the raceway 314, these power lines are connected to cable or conduit assemblies 316. Such cable or conduit assemblies 316 may be similar to assemblies such as cable or conduit assembly 147 associated with the prior art system illustrated in FIG. 2. Correspondingly, these cable or conduit assemblies may include female connector blocks, such as connector block 140 also illustrated in FIG. 2. The cable or conduit assemblies 316 may also include male connector blocks at opposing ends relative to the female connector blocks, such as the male connector block 145 also illustrated in FIG. 2. Further, the cable or conduit assemblies 316 may also include junction blocks. These junction blocks may take the form of blocks such as junction block 120 further illustrated in the prior art system in FIG. 2. Also, the junction blocks can take on other configurations, and the end of a different configuration of junction block is illustrated in FIG. 14 as junction block 340.

As the cable or conduit assemblies 316 extend through the raceway 314, the junction blocks (not specifically shown in FIG. 9) will be positioned at various locations along the raceway 314. At these locations, receptacle blocks 320 (which may substantially correspond to the electrical outlet receptacle block 150 previously illustrated in FIG. 4 and described herein) may be electrically engaged (i.e. “plugged in”) to the junction blocks of the cable or conduit assemblies 316. For example, FIG. 9 illustrates one receptacle block 320 at the beginning of the cable or conduit assembly 316 which is electrically connected to power line 310. Another electrical receptacle block 320 is illustrated as being electrically connected through cable or conduit assemblies 316 to power line 306. These receptacle blocks 320 can be electrically connected to the junction blocks of the cable or conduit assemblies 316 through connection of male connector terminals in the receptacle blocks 320 to corresponding female connectors associated with the junction blocks of the cable or conduit assemblies 316. Again, such a configuration is illustrated in FIGS. 2-5 with respect to the prior art system previously described herein.

In accordance with the invention, the power distribution system 300 also includes a pluggable surge protector 324, as illustrated in FIGS. 9-12. The pluggable search protector 324 can include, as described in subsequent paragraphs herein, male connector terminals 326 such that the surge protector 324 can “plug into” a junction block of a cable or conduit assembly 316 in the same manner as a receptacle block 320 would plug into a junction block of the cable or conduit assembly 316. In this manner, the circuit or circuits which are “downstream” of the surge protector 324 along the particular power distribution line to which the surge protector 324 is associated, would be protected from transient surges. As illustrated in FIG. 9, the surge protector 324 is associated with the circuit represented by incoming power line 310. As further shown in FIG. 9, a cable or conduit assembly 316 extends toward the surge protector 324. The surge protector 324 is “plugged in” to the junction block associated with that particular cable or conduit assembly 316. The cable or conduit assembly 316 which can be characterized as “outgoing” relative to the location of the surge protector 324 is illustrated as cable 350. Cable 350 would extend toward or be connected to another cable or conduit assembly, which is shown in FIG. 9 as cable or conduit assembly 352. The cable or conduit assembly 352 would have a junction block associated therewith, and the receptacle block 354 illustrated in FIG. 9 would be plugged into such junction block. A further cable or conduit assembly 356 may then extend outwardly downstream of the receptacle block 354. With the use of the pluggable surge protector 324, the receptacle block 354 and any other receptacle blocks electrically connected to the cable or conduit assemblies downstream of the surge protector 324 will be protected. From the standpoint of a physically realizable circuit, it has been found by the inventor that protection can exist for a distance of at least 35 feet downstream of the surge protector 324.

With respect to the other circuits associated with the power distribution system 300, these other circuits are represented as incoming circuits from power lines 304, 306 and 308. As illustrated in FIG. 9, the cable or conduit assemblies 316 electrically connected (either directly or indirectly) to the power lines 304, 306 or 308 can be characterized as "unprotected" circuits. That is, for example, the electrical receptacle block 320 which is shown as being connected to power lines 306 and 308 (at least indirectly) would be characterized as an unprotected circuit, in that the surge protector 324 is not within the circuit paths from these power lines to the receptacle block 320.

Turning to the specific example embodiment of the surge protector 324 in accordance with the invention as illustrated herein, the surge protector is illustrated primarily in FIGS. 10, 11 and 12. Therein, the surge protector 324 is illustrated as having male connector sets 326 extending outwardly from each end of the protector 324. The use of male connector sets 326 at each end of the surge protector 324 allows the surge protector 324 to be plugged into a junction block from either side. Accordingly, and with reference back to FIG. 2 of the prior art system, the surge protector 324 could be plugged into any one of the four female connectors 126 associated with the junction block 120. Continuing with reference to FIGS. 10, 11 and 12, the surge protector 324 includes a side portion 328. The side portion 328 will extend laterally outward when the surge protector 324 is electrically connected to the junction block of a cable or conduit assembly 316. At the top of the surge protector 324 is an upper portion 330. A lower portion 332 extends downwardly from the protector 324. A connecting clip 334 is shown at the top of the surge protector 334. This connecting clip is optional, but may be utilized to secure the surge protector 324 within the junction block which utilizes a recessed area or otherwise utilizes a corresponding clip at the top portion thereof, for purposes of securing the surge protector 324 to the recessed area. Such a configuration of a junction block with a tab at the top portion of the receptacle block is illustrated in Byrne, U.S. Pat. No. 6,036,516 issued Mar. 14, 2000. The patent is hereby incorporated by reference herein. In addition to the use of the clip 334, the bottom portion or lower portion 332 of the surge protector 324 can include a latch 336. The latch 336 is similar to the spring latch 352 described with respect to the prior art system and illustrated in FIG. 4 hereof. The latch 336 is adapted to assist in releasably securing the surge protector 324 to a junction block of a cable or conduit assembly 316.

As further shown in FIGS. 10 and 11, the surge protector 324 includes an LED indicator 338. As described in subsequent paragraphs herein, if the surge protector 324 "trips," the LED indicator 338 would go from an energized state to a deenergized or "unlit" state.

As earlier stated, the surge protection 324 could be electrically energized through connection to female connector sets within junction blocks such as the junction block 120 illustrated in FIG. 2. In addition, the surge protector 324 could be utilized with a modified configuration of a junction block, such as the junction block 340 illustrated in an end view in FIG. 14. This junction block would be similar to the junction block 22 illustrated in Byrne, U.S. Pat. No. 6,036,516 issued Mar. 14, 2000 and incorporated by reference herein.

Figure 13:
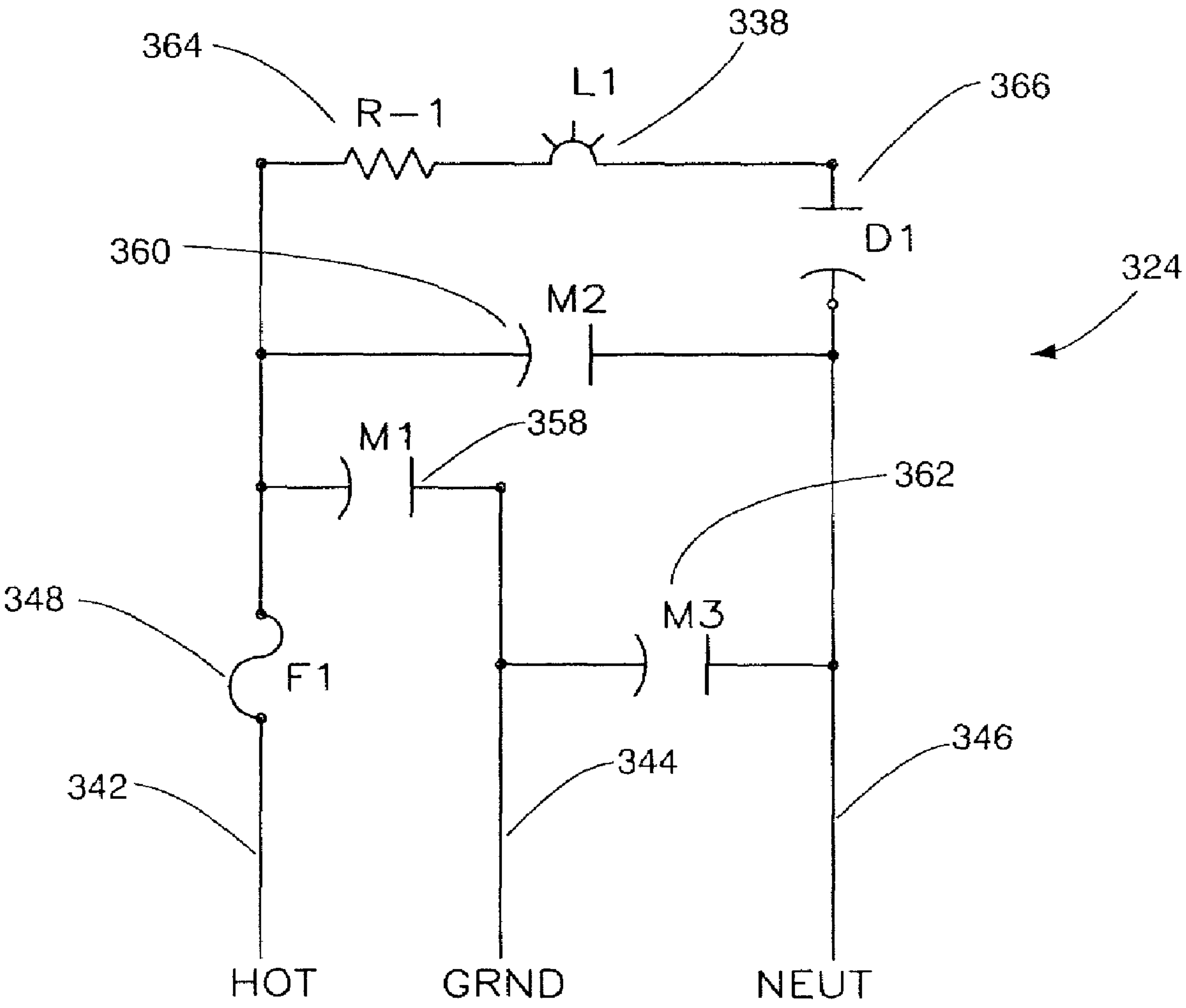
FIG. 13 is a circuit diagram showing an example circuit which may be utilized with the surge protector shown in FIG. 10.

FIG. 13 illustrates one example circuit which may be utilized with the surge protector 324. As shown therein, the male connector terminals 326 (illustrated in FIG. 10) would correspond to a hot terminal or wire 342, ground terminal or wire 344 and neutral terminal or wire 346. It should be emphasized that in this particular configuration, the surge protector 324 is protecting only one circuit. As described in subsequent paragraphs herein, multiple circuits could also be protected by the protector 324.

The hot wire 342 is connected in series to a fuse 348. Connected between the ground wire 334 and one end of the fuse 348 is a metal oxide varistor 358. For purposes of description, this component will be described as MOV 358. The MOV 358 is a discrete electronic component typically used in surge suppressors for diverting excessive voltage to ground or neutral lines. As further shown in FIG. 13, another MOV 362 is connected between the ground wire 348 and neutral wire 346. Correspondingly, a third MOV 360 is connected directly between the hot wire 342 (on the other side of the fuse 348) and the neutral wire 346. Extending in parallel configuration to the MOV 360 is a series connection of a resistor 364 and the LED indicator 338. Also in series with this configuration is a diode 366. With this configuration, if an excessive transient voltage occurs on the power line corresponding to the wires 342, 344 and 346, the fuse 348 will be tripped, and the MOV's 358, 360 and 362 will divert the excessive voltage to the ground wire 344 and neutral wire 346. Correspondingly, with the fuse 348 tripped, current will no longer flow through the resistor 364 and LED indicator 338. Accordingly, the LED indicator 338 will go to a deenergized or "unlit" state.

Figure 16:
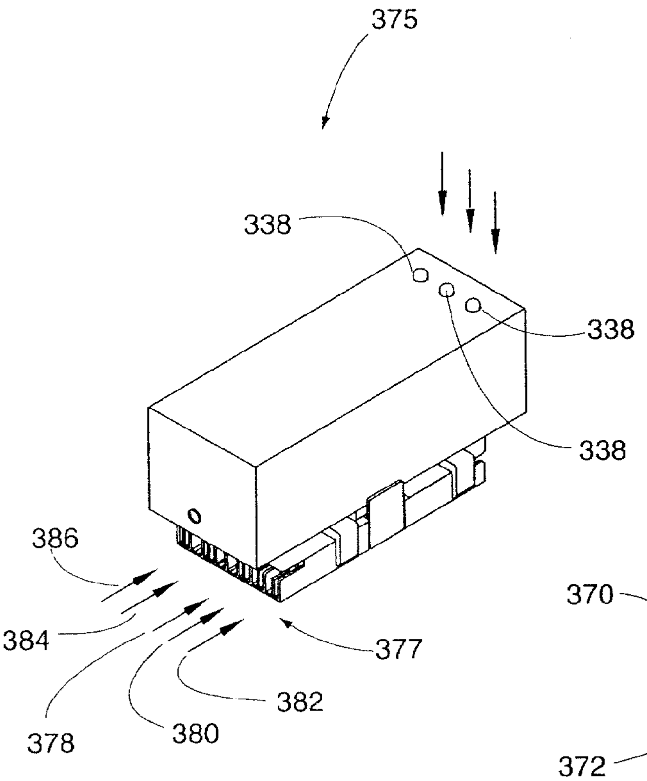
FIG. 16 is a perspective view of a third embodiment of a surge protector in accordance with the invention, configured to protect three separate circuits.
Figure 15:
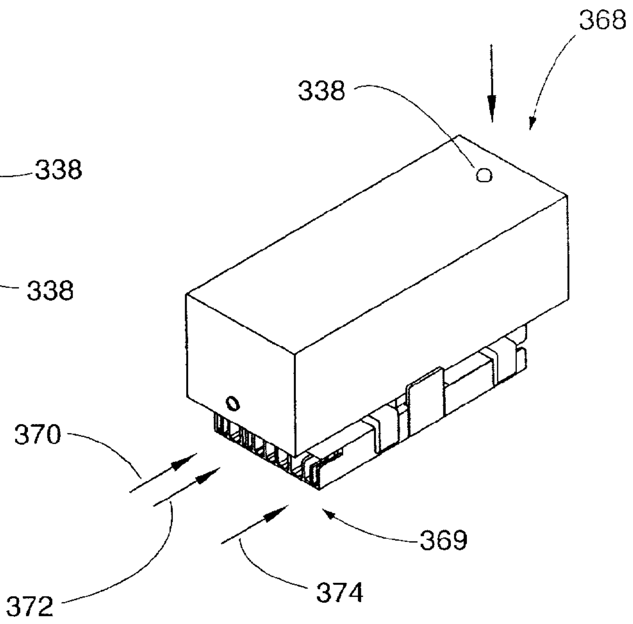
FIG. 15 is a perspective view of a second embodiment of a surge protector in accordance with the invention.

A somewhat modified embodiment of a surge protector in accordance with the invention is illustrated as surge protector 368 shown in FIG. 15. Therein, the surge protector 368 has a slightly different structural configuration. However, the protector 368, like the protector 324, has at least one male connector set 369 on at least one end of the protector 368. A representation is shown in FIG. 15 of a female connector set (which may be associated with a junction block) consisting of hot terminal 370, neutral terminal 372 and ground terminal 374. With this configuration, the surge protector 368, like the surge protector 324, is protecting one circuit. As an alternative, FIG. 16 illustrates another surge protector 376, also in accordance with the invention. The surge protector 376 is substantially similar to the surge protectors 324 and 368, but will include circuitry for receiving three separate incoming power circuits. This representation is shown by the use of three hot terminals 378, 380 and 386 adapted to be connected to corresponding terminals of the male connector set 377. Also, FIG. 16 illustrates a representation of a neutral terminal 384 and a ground terminal 386 connected to appropriate male terminals of the connector set 377. With this configuration, surge protection can be provided for three separate circuits. Also with this configuration, in view of the three separate circuits being protected, the surge protector 376 would include a series of three LED indicators 338. Each of the LED indicators 338 would represent the state of a different one of the three circuits being protected.

In accordance with the foregoing, pluggable surge protectors in accordance with the invention have been described and illustrated. These surge protectors have the capability of being plugged into conventional connector sets of junction blocks which are typically used for interconnection of electrical receptacle blocks to the junction blocks. Accordingly, no additional or specialized circuitry associated with the power distribution systems is required. Further, the pluggable surge protector, being "inline" with a particular circuit of the power distribution system, provides for surge protection for all electrical receptacle blocks downstream of the surge protector, at least for some given distance.

It will be apparent to those skilled in the pertinent arts that still other embodiments of surge protectors in accordance with the invention can be designed. That is the principles of a pluggable surge protector in accordance with the invention are not limited to the specific embodiments described herein. Accordingly, it will be apparent to those skilled in the art that modifications and other variations of the above-described illustrative embodiments of the invention may be effected without departing from the spirit and scope of the novel concepts of the invention.

The embodiments of the invention in which an exclusive property or privilege is claimed is defined as follows:

1. A power distribution system for use in distributing electrical power, said distribution system comprising:

a source of incoming electrical power comprising at least a first electrical circuit;

a cable or conduit assembly having at least a first junction block coupled to interconnecting cables, where at least one of said interconnecting cables is electrically coupled, directly or indirectly, to said incoming power circuit;

electrical receptacle means releasably and electrically connectable to said first junction block;

a second junction block electrically connected to said first junction block and located upstream of said first junction block, relative to said incoming power circuit;

surge protection means releasably and electrically connectable to said second junction block, said surge protection means being pluggable into said second junction block and having means for protecting said first junction block and said electrical receptacle means from excessive voltages which may be applied to said first electrical circuit while said first junction block locates downstream of said second junction block; and said surge protection means is pluggable into, and connectable to, said first junction block, in a manner interchangeable with said electrical receptacle means being connected to said first junction block.

2. A power distribution system in accordance with claim 1, characterized in that said surge protection means comprises a first connector set adapted to releasably plug into a second connector set associated with said second junction block.

3. A power distribution system in accordance with claim 1, characterized in that said surge protection means comprises visual indicator means viewable by a user, and responsive to the state of circuitry within said surge protection means so as to indicate whether said surge protection means has been tripped.

4. A power distribution system in accordance with claim 2, characterized in that said surge protection means comprises a second connector set extending outwardly from an end of said surge protection means which opposes an end of said surge protection means comprising said first connector set.

5. A power distribution system in accordance with claim 1, characterized in that said second junction block is electrically positioned between said source of incoming electrical power and said first junction block.

6. A power distribution system in accordance with claim 5, characterized in that said first junction block is positioned along said cable or conduit assembly so that said first junction block is within thirty-five feet of said second junction block.

7. A power distribution system in accordance with claim 5, characterized in that said first junction block is positioned between fifteen and thirty feet of said second junction block.

8. A power distribution system in accordance with claim 1, characterized in that said electrical receptacle means is capable of being releasably connected to said second junction block in the absence of said surge protection means being connected to said second junction block.

9. A power distribution system in accordance with claim 1, characterized in that said surge protection means comprises:

a first set of connectors adapted to releasably plug into a connector set associated with said second junction block; and a second set of connectors opposing said first set of connectors, and adapted to releasably plug into a connector set of either said second junction block or a further junction block.

10. A power distribution system in accordance with claim 9, characterized in that said first connector set extends outwardly from one end of said surge protection means, and said second connector set extends outwardly from an opposing end of said surge protection means.

11. A power distribution system in accordance with claim 1, characterized in that:

said source of incoming electrical power comprises a plurality of electrical circuits; and said surge protection means comprises means for electrically connecting into said plurality of electrical circuits, and means for protecting junction blocks and electrical receptacle means from excessive voltages which may be applied to two or more of said plurality of electrical circuits.

12. A power distribution system in accordance with claim 1, characterized in that said surge protection means comprises at least one surge protector, said surge protector comprising:

connector terminals having at least one hot terminal, one ground terminal and one neutral terminal;

said hot terminal being connected in series to a fuse;

a first varistor connected between said ground terminal and one end of said fuse;

a second varistor connected between said ground terminal and said neutral terminal;

a third varistor connected directly between said hot terminal on an opposing side of said fuse, and said neutral terminal; and a diode.

13. A power distribution system in accordance with claim 12, characterized in that said surge protector further comprises a series connection of a resistor and an LED indicator extending in parallel configuration to said third varistor.

* * * * *